United States Patent
Hara et al.

(10) Patent No.: US 10,065,265 B2
(45) Date of Patent: Sep. 4, 2018

(54) JOINED BODY

(71) Applicant: KAYABA INDUSTRY CO., LTD., Tokyo (JP)

(72) Inventors: Takahiko Hara, Gifu (JP); Takayasu Kawakami, Gifu (JP); Hiroshi Oyama, Gifu (JP); Yusuke Takahashi, Gifu (JP); Kenichi Hiraki, Gifu (JP)

(73) Assignee: KYB Corporation, Tokyo (JP)

( * ) Notice: Subject to any disclaimer, the term of this patent is extended or adjusted under 35 U.S.C. 154(b) by 96 days.

(21) Appl. No.: 14/772,620

(22) PCT Filed: Mar. 27, 2014

(86) PCT No.: PCT/JP2014/058764
§ 371 (c)(1),
(2) Date: Sep. 3, 2015

(87) PCT Pub. No.: WO2014/157467
PCT Pub. Date: Oct. 2, 2014

(65) Prior Publication Data
US 2016/0008917 A1    Jan. 14, 2016

(30) Foreign Application Priority Data
Mar. 28, 2013    (JP) ................. 2013-070037

(51) Int. Cl.
*B25G 3/34*    (2006.01)
*F16B 11/00*    (2006.01)
(Continued)

(52) U.S. Cl.
CPC ............ *B23K 20/129* (2013.01); *B23K 20/12* (2013.01); *B23K 33/006* (2013.01);
(Continued)

(58) Field of Classification Search
CPC .. Y10T 403/477; B23K 20/12; B23K 20/129; B23K 33/006; B23K 2201/003;
(Continued)

(56) References Cited

U.S. PATENT DOCUMENTS 3,004,779 A * 10/1961 Cullen .................... F16L 33/01
                                                     285/222.5
4,445,265 A *  5/1984 Olson .................. B23K 20/129
                                                     228/114.5
(Continued)

FOREIGN PATENT DOCUMENTS

DE    102009059055 A1    6/2011
JP      53-032857 A      3/1978
(Continued)

*Primary Examiner* — Amber Anderson
*Assistant Examiner* — Nahid Amiri
(74) *Attorney, Agent, or Firm* — Rabin & Berdo, P.C.

(57) ABSTRACT

A joined body is formed by joining end surfaces of two joining members to each other by a friction welding. The joined body includes a hollow portion formed on at least one of the two joining members, the hollow portion being configured to have an opening at the joining face between the two joining members. The joined body also includes an annular groove portion formed on an inner circumferential surface of the hollow portion at a position separated from a joining face in an axial direction.

14 Claims, 3 Drawing Sheets

(51) Int. Cl.
*F16B 12/04* (2006.01)
*F16L 13/00* (2006.01)
*B23K 20/12* (2006.01)
*B23K 33/00* (2006.01)
*F15B 15/14* (2006.01)
*B23K 101/04* (2006.01)
*B23K 101/00* (2006.01)

(52) U.S. Cl.
CPC .... *F15B 15/1457* (2013.01); *B23K 2201/003* (2013.01); *B23K 2201/04* (2013.01)

(58) Field of Classification Search
CPC .. B23K 2201/04; F15B 15/1457; F16L 13/02; F16L 13/0227
USPC ............................ 403/270; 285/288.1, 288.2
See application file for complete search history.

(56) References Cited

U.S. PATENT DOCUMENTS

| | | | | |
|---|---|---|---|---|
| 5,027,996 A | * | 7/1991 | Fefeu | F16J 1/16 228/114 |
| 5,076,148 A | * | 12/1991 | Adler | F04B 1/124 29/888.02 |
| 6,588,321 B1 | * | 7/2003 | Stoppek | B23P 15/10 92/172 |
| 6,736,305 B2 | * | 5/2004 | Foster | B23K 20/12 219/617 |
| 7,478,701 B2 | * | 1/2009 | Kobayashi | B22C 9/22 180/299 |
| 8,156,648 B2 | * | 4/2012 | Audart-Noel | F16C 7/02 29/463 |
| 8,419,073 B2 | * | 4/2013 | Harhoff | F02M 55/025 123/456 |
| 8,814,028 B2 | * | 8/2014 | Ogawa | F16C 3/023 228/114.5 |
| 2009/0101454 A1 | | 4/2009 | Nanri et al. | |
| 2010/0040900 A1 | * | 2/2010 | Sumi | B23K 20/121 428/586 |
| 2010/0213245 A1 | * | 8/2010 | Bass | B23K 20/12 228/114 |
| 2012/0160899 A1 | * | 6/2012 | Dogami | B23K 20/12 228/114 |
| 2016/0199951 A1 | * | 7/2016 | Kobayashi | B23K 20/12 29/888.044 |

FOREIGN PATENT DOCUMENTS

| | | |
|---|---|---|
| JP | 2009-103187 A | 5/2009 |
| JP | 2011-056531 A | 3/2011 |
| JP | 2012-057696 A | 3/2012 |

* cited by examiner

JOINED BODY

TECHNICAL FIELD

The present invention relates to a joined body.

BACKGROUND ART

A method of producing a piston rod by joining end surfaces of a rod main body and a rod head to each other by a friction welding is known. JP2011-56531A discloses a technique to join, by the friction welding, a rod main body whose axial-center portion of an end surface is recessed and a rod head whose axial-center portion of an end surface is recessed in a similar manner. With this technique, because it is possible to reduce the joining area compared with a case in which the end surfaces are not recessed, a size of an equipment for the friction welding can be reduced.

SUMMARY OF INVENTION

With the above-mentioned conventional technique, a base material of the end surface is discharged to the outer circumferential side and the inner circumferential side of a joining face due to plastic flow during the friction welding, and remains as beads. Although the beads on the outer circumferential side can be removed after the friction welding by cutting etc., it is difficult to remove the beads on the inner circumferential side.

Thus, there is a risk that, when tensile and compressive load in the axial direction act repeatedly on the piston rod, stress is concentrated on root portions of the remaining beads on the inner circumferential side.

An object of the present invention is to suppress deterioration of durability of a joined body without removing beads formed on an inner circumferential side of a joining face.

According to one aspect of the present invention, a joined body formed by joining end surfaces of two joining members to each other by a friction welding, the joined body includes a hollow portion formed on at least one of the two joining members, the hollow portion being configured to have an opening at the joining face between the two joining members; and an annular groove portion formed on an inner circumferential surface of the hollow portion at a position separated from a joining face in an axial direction.

DESCRIPTION OF EMBODIMENTS

Embodiments of the present invention will be described below with reference to the attached drawings.

Figure 1:
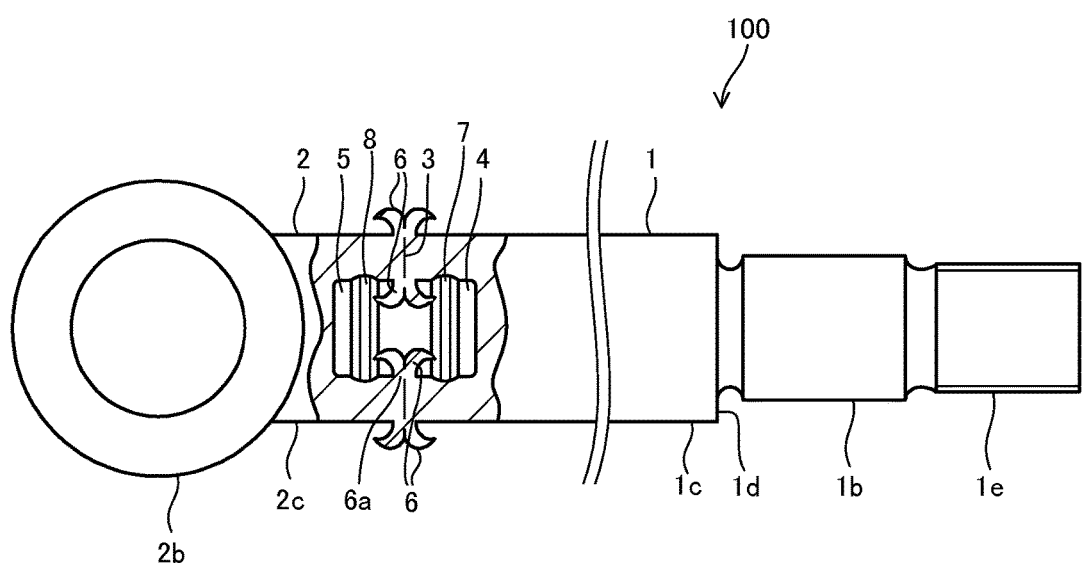
FIG. 1 is a plan view showing a piston rod according to an embodiment of the present invention, in which a part thereof is shown in a sectional view.
Figure 2:
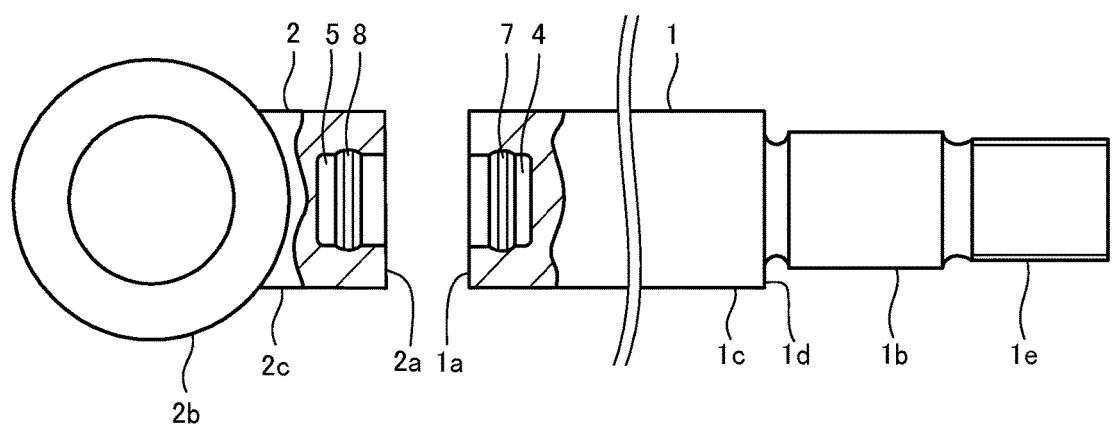
FIG. 2 is a plan view showing a rod main body and a rod head before a friction welding, in which parts thereof are shown in sectional views.

FIG. 1 is a plan view showing a piston rod 100 in this embodiment. FIG. 2 is a plan view showing a rod main body 1 and a rod head 2 before a friction welding. Here, in order to simplify the description, a part of the rod main body 1 is omitted, and the rod main body 1 is shown in a shortened form. The piston rod 100 in this embodiment is inserted to be free to advance and retreat into a cylinder main body of a fluid pressure cylinder that is used as an actuator (not shown).

The piston rod 100 as a joined body includes the rod main body 1 as a joining member and the rod head 2 as a joining member to be joined with an end surface 1a of the rod main body 1. The piston rod 100 is formed by joining end surfaces 1a and 2a of the rod main body 1 and the rod head 2 to each other by a friction welding.

The solid rod main body 1 has a small-diameter portion 1b to which a piston (not shown) that slides inside the cylinder main body is to be linked and a large-diameter portion 1c that has a diameter larger than that of the small-diameter portion 1b. The annular piston is anchored to a step portion 1d positioned on the boundary between the small-diameter portion 1b and the large-diameter portion 1c by being fitted to the outer circumference of the small-diameter portion 1b, and the piston is fixed by a nut (not shown) that is fastened to a male screw portion 1e of the small-diameter portion 1b. The planar end surface 1a is formed on the opposite side of the small-diameter portion 1b of the rod main body 1 in the axial direction. A hollow portion 4 having a recessed shape is formed on the end surface 1a. The hollow portion 4 is formed concavely in the axial direction from an axial-center portion of the end surface 1a so as to have an opening at the end surface 1a.

The solid rod head 2 has an annular clevis 2b that is to be connected to a load and a solid body portion 2c having the same diameter as the large-diameter portion 1c of the rod main body 1. A planar end surface 2a is formed on the opposite side of the clevis 2b of the body portion 2c in the axial direction. A hollow portion 5 is formed on the end surface 2a. The hollow portion 5 is formed concavely in the axial direction from an axial-center portion of the end surface 2a so as to have an opening at the end surface 2a.

As shown in FIG. 2, the end surface 1a of the rod main body 1 and the end surface 2a of the rod head 2 are joined by the friction welding. At this time, because the hollow portions 4 and 5 have openings at both of the end surfaces 1a and 2a, respectively, the joining area has a value obtained by subtracting the opening areas of the hollow portions 4 and 5 from the areas of the end surfaces 1a and 2a, respectively. Therefore, it is possible to reduce the joining area compared with a case in which members without the hollow portions 4 and 5 are subjected to the friction welding, and thereby, it is possible to reduce the size of an equipment required for the friction welding. Furthermore, it is possible to remove impurities caused by center segregation occurred during casting of round rod materials that serve as raw materials for the rod main body 1 and the rod head 2.

Here, during the friction welding, base materials of the end surfaces 1a and 2a are discharged out from a joining face 3 between the rod main body 1 and the rod head 2 due to plastic flow. Thus, when the rod main body 1 and the rod head 2, in which the hollow portions 4 and 5 have openings at the end surfaces 1a and 2a, are joined by the friction welding, as shown in FIG. 1, the base materials that have been discharged to the outer circumferential side and the inner circumferential side of the joining face 3 remain as beads 6. Although it is possible to remove the beads 6 on the outer circumferential side of the joining face 3 after the friction welding by cutting etc., the beads 6 on the inner circumferential side cannot be removed because the beads 6 remain in a closed space within the piston rod 100.

Because the piston rod 100 is subjected to repetitive tensile and compressive load especially in the axial direction, there is a risk that the stress concentrates on root portions 6a of the beads 6 remaining on the inner circumferential side.

Therefore, in this embodiment, annular groove portions 7 and 8 are formed on the inner circumferential surfaces of the respective hollow portions 4 and 5 of the rod main body 1 and the rod head 2.

The groove portions 7 and 8 are formed at the positions separated from the joining face 3 between the rod main body 1 and the rod head 2 in the axial direction by predetermined distances. In other words, the groove portion 7 provided in the hollow portion 4 of the rod main body 1 and the groove portion 8 provided in the hollow portion 5 of the rod head 2 are arranged at both sides of the joining face 3 in the axial direction so as to sandwich the joining face 3. In addition, the groove portions 7 and 8 are formed such that the cross-sections thereof have substantially U-shaped arc shapes.

The predetermined distance that defines the position of the groove portion 7 in the axial direction is set to a value obtained by adding an upset distance that is a displacement in the axial direction due to loss of the end surface 1a of the rod main body 1 under an upset pressure during the friction welding, the width of the beads 6, in the axial direction, that remain on the inner circumferential side and the rod main body 1 side of the joining face 3 after the friction welding, and a dimensional tolerance in the rod main body 1.

Similarly, the predetermined distance that defines the position of the groove portion 8 in the axial direction is set to a value obtained by adding an upset distance that is a displacement in the axial direction due to loss of the end surface 2a of the rod head 2 under the upset pressure during the friction welding, the width of the beads 6, in the axial direction, that remain on the inner circumferential side and the rod head 2 side of the joining face 3 after the friction welding, and a dimensional tolerance in the rod head 2.

The upset distance and the width of the beads 6 will have different values depending on the outer diameters of the rod main body 1 and the rod head 2, the inner diameters of the hollow portions 4 and 5, and so forth, and these values are obtained in experiments etc. in advance.

With this configuration, after the friction welding, the groove portions 7 and 8 are arranged so as to be in the vicinity of the root portions 6a of the beads 6.

As described above, because the groove portions 7 and 8 having diameters greater than those of the root portions 6a of the beads 6 are formed in the vicinity of the locations where the beads 6 are formed, it is possible to change the flow of the line of the force in the axial direction for the tensile and compressive load acting on the piston rod 100 with the groove portions 7 and 8, and it is possible to reduce the load acting on the root portions 6a. Therefore, it is possible to avoid the concentration of the stress on the root portions 6a of the beads 6.

The above-mentioned embodiment affords the effects described below.

Because the annular groove portions 7 and 8 are formed at positions separated from the joining face 3 in the axial direction on the inner circumferential surfaces of the rod main body 1 and the rod head 2, it is possible to change the flow of the line of the force for the load acting on the piston rod 100 in the axial direction with the groove portions 7 and 8. Therefore, it is possible to reduce the stress acting on the root portions 6a of the beads 6 formed on the inner circumferential side of the joining face 3 during the friction welding, and therefore, it is possible to suppress deterioration of the durability of the piston rod 100 without removing the beads 6.

Furthermore, because the groove portions 7 and 8 are arranged so as to be in the vicinity of the root portions 6a of the beads 6, it is possible to more reliably reduce the stress acting on the root portions 6a of the beads 6 without increasing the depths of the groove portions 7 and 8.

Furthermore, the predetermined distances that define the positions of the groove portions 7 and 8 in the axial direction are set to the values obtained by adding the upset distance that is the displacement in the axial direction due to the loss of the end surface 1a of the rod main body 1 or the end surface 2a of the rod head 2 under the upset pressure during the friction welding, the width of the beads 6, in the axial direction, that remain on the inner circumferential side and the rod main body 1 side or the rod head 2 side of the joining face 3 after the friction welding, and the dimensional tolerance in the rod main body 1 or the rod head 2. Therefore, the groove portions 7 and 8 are arranged so as to be in the vicinity of the root portions 6a of the beads 6 after the friction welding, and thus, it is possible to even more reliably reduce the stress acting on the root portions 6a of the beads 6.

Furthermore, because the rod main body 1 and the rod head 2 are solid members, and because the hollow portions 4 and 5 respectively have openings at the end surfaces 1a and 2a, which form the joining face 3, and have recessed shapes that are depressed in the axial direction, it is possible to reduce the size of the equipment for the friction welding by reducing the area of the joining face 3 for the friction welding while ensuring the strength of the piston rod 100.

Furthermore, because the sectional shapes of the groove portions 7 and 8 are substantially U-shaped arc shapes, it is possible to reduce the change in the sectional shapes of the groove portions 7 and 8, and thus, it is possible to reduce the stress acting on the root portions 6a of the beads 6 without a portion on which the stress is locally concentrated.

Embodiments of this invention were described above, but the above embodiments are merely examples of applications of this invention, and the technical scope of this invention is not limited to the specific constitutions of the above embodiments.

For example, in the above-mentioned embodiment, although a case in which the piston rod 100 is formed by joining the solid rod main body 1 and the solid rod head 2 is illustrated, at least one of the members may be a hollow member. In this case, the hollow portion 4 or 5 needs not be additionally provided, and a part of the interior space of the hollow member serves as the above-mentioned hollow portion 4 or 5.

Furthermore, in the above-mentioned embodiment, although the hollow portions 4 and 5 are formed on the rod main body 1 and the rod head 2, respectively, the hollow portion may only be provided on either one of the members. In this case, the groove portion is formed only on the member on which the hollow portion has been provided.

Furthermore, in the above-mentioned embodiment, although the groove portions 7 and 8 are respectively formed on the hollow portions 4 and 5 of the rod main body 1 and the rod head 2, the groove portion may only be formed on either one of members. In this case, by providing the groove portion on the member having lower material strength, it is possible to avoid the concentration of the stress on the root portions 6a of the beads on the member having lower material strength.

Furthermore, in the above-mentioned embodiment, although a case in which the sectional shapes of the groove portions 7 and 8 are arc shapes is illustrated, the sectional shapes are not limited to these shapes, and they may have other shapes. In this case, it is preferred that the sectional shape of the groove portion has a shape such that the stress is not easily concentrated.

Figure 3:
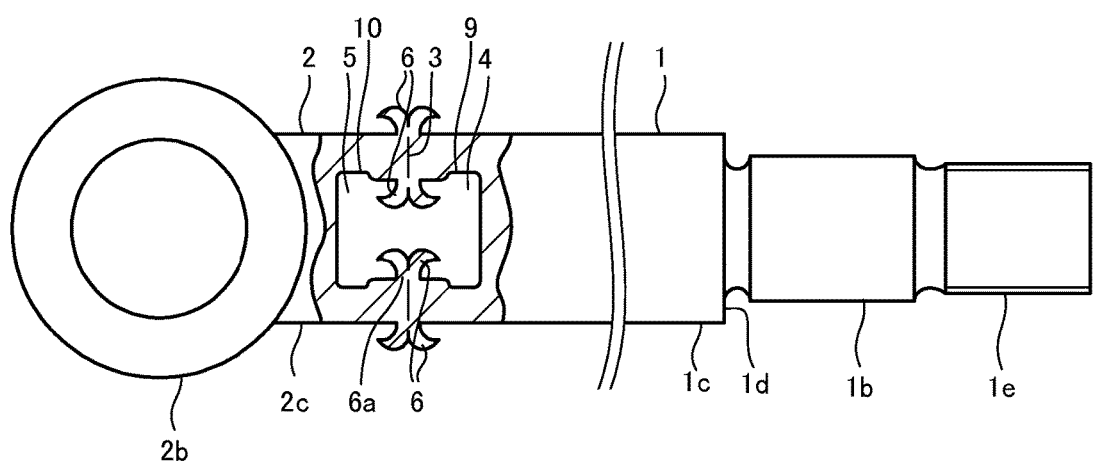
FIG. 3 is a plan view showing a piston rod according to a reference example, in which a part thereof is shown in a sectional view.

Furthermore, in the above-mentioned embodiment, although the groove portions 7 and 8 are formed in partial regions on the inner circumferential surfaces of the hollow portions 4 and 5 in the axial direction, similar to the reference example shown in FIG. 3, groove portions 9 and 10 may be formed over the whole regions of the hollow portions 4 and 5 in the axial direction.

Furthermore, in the above-mentioned embodiment, although the piston rod 100 that is formed by joining the rod main body 1 and the rod head 2 is illustrated, the present invention may be applied to other members. For example, even when the present invention is applied to a case in which two cylindrical joining members are joined by the friction welding to form a cylinder tube, it is possible to afford similar advantages and effects as those described above.

Furthermore, in the above-mentioned embodiment, although the hollow portions 4 and 5 are formed concavely in the axial direction from the end surface 1*a* of the rod main body 1 and the end surface 2*a* of the rod head 2, respectively, the hollow portions 4 and 5 may be shallow such that the depths in the axial direction are less than the inner diameters of the hollow portions 4 and 5, or the hollow portions 4 and 5 may be deep such that the depths in the axial direction are greater than the inner diameters of the hollow portions 4 and 5.

This application claims priority based on Japanese Patent Application No. 2013-70037 filed with the Japan Patent Office on Mar. 28, 2013, the entire contents of which are incorporated into this specification.

The invention claimed is:

1. A joined body that is formed by joining end surfaces of two joining members to each other by a friction welding, comprising:
    hollow portions respectively formed on the two joining members, each of the hollow portions being configured to have an opening at a joining face between the two joining members; and
    an annular groove portion formed on an inner circumferential surface of at least one of the hollow portions, wherein
    a bead formed by the friction welding is provided in the hollow portion in which the groove portion is formed,
    the groove portion is arranged at a position separated in an axial direction from a root portion of the bead provided in the hollow portion in which the groove portion is formed,
    the groove portion is formed only in a part, in the axial direction, of the inner circumferential surface of at least one of the hollow portions,
    the inner circumferential surface of the hollow portion has:
        a first surface having an inner diameter smaller than that of the groove portion, the bead being provided on the first surface; and
        a second surface having an inner diameter smaller than that of the groove portion, the groove portion being provided between the first surface and the second surface in the axial direction.

2. The joined body according to claim 1 wherein a closed space is formed by the hollow portions, and the bead is provided in the closed space.

3. The joined body according to claim 1 wherein the groove portion is configured to change a flow of a line of a force in the axial direction acting on the joined body so as to prevent a stress concentration on the root portion of the bead.

4. The joined body according to claim 1, wherein at least one of the two joining members in which the hollow portions are provided is a solid member, and the hollow portions are recessed portions that are formed concavely in the axial direction from an axial-center portion of the joining face.

5. The joined body according to claim 1, wherein the hollow portions are individually formed in both of the two joining members, and the groove portion is formed such that a cross-section thereof has an arc shape.

6. The joined body according to claim 1, wherein the joined body is a piston rod, and the two joining members are a rod main body and a rod head, respectively.

7. The joined body according to claim 1, wherein the groove portion is formed on each of inner circumferential surfaces of the hollow portions.

8. A joined body that is formed by joining end surfaces of two joining members to each other by a friction welding, comprising:
    a hollow portion formed on at least one of the two joining members, the hollow portion being configured to have an opening at a joining face between the two joining members;
    an annular groove portion formed on an inner circumferential surface of the hollow portion, wherein
    a bead formed by the friction welding is provided in the hollow portion,
    the groove portion is formed only on a part of the inner circumferential surface of the hollow portion in the axial direction, and
    the groove portion is arranged at a position separated in an axial direction from a root portion of the bead provided in the hollow portion, and
    the groove portion is formed only in a part, in the axial direction, of the inner circumferential surface of the hollow portion,
    the inner circumferential surface of the hollow portion has:
        a first surface having an inner diameter smaller than that of the groove portion, the bead being provided on the first surface; and
        a second surface having an inner diameter smaller than that of the groove portion, the groove portion being provided between the first surface and the second surface in the axial direction.

9. The joined body according to claim 8, wherein a closed space is formed by the hollow portion, and the bead is provided in the closed space.

10. The joined body according to claim 9, wherein the at least one joining member in which the hollow portion is provided is a solid member, and the hollow portion is a recessed portion that is formed concavely in the axial direction from an axial-center portion of the joining face.

11. The joined body according to claim 8, wherein the groove portion is formed such that a cross-section thereof has an arc shape.

12. The joined body according to claim 8, wherein
the joined body is a piston rod, and
the two joining members are a rod main body and a rod head, respectively.

13. The joined body according to claim 8, wherein
the hollow portion is formed in each of the joining members, and
the groove portion is formed on each of inner circumferential surfaces of the hollow portions.

14. The joined body according to claim 8, wherein
the groove portion is configured to change a flow of a line of a force in the axial direction acting on the joined body so as to prevent a stress concentration on the root portion of the bead.

\* \* \* \* \*